Jan. 22, 1924.
L. W. LUELLEN
1,481,294
SIGHT FOR FIREARMS
Filed Nov. 1, 1918
2 Sheets-Sheet 1
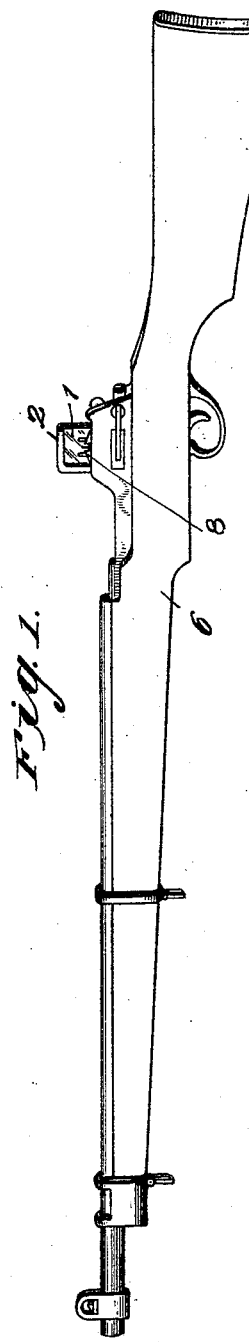
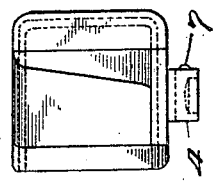
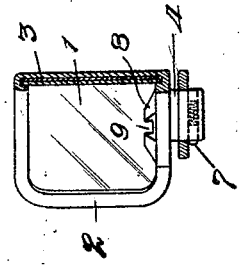
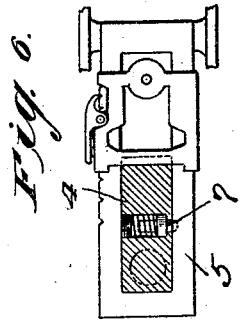
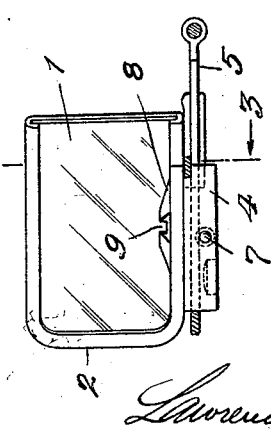
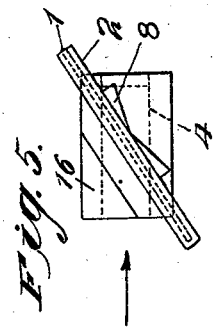
INVENTOR
Lawrence W. Luellen
BY William P. Hammond
ATTORNEY Jan. 22, 1924.
L. W. LUELLEN
SIGHT FOR FIREARMS
Filed Nov. 1, 1918
1,481,294
2 Sheets-Sheet 2
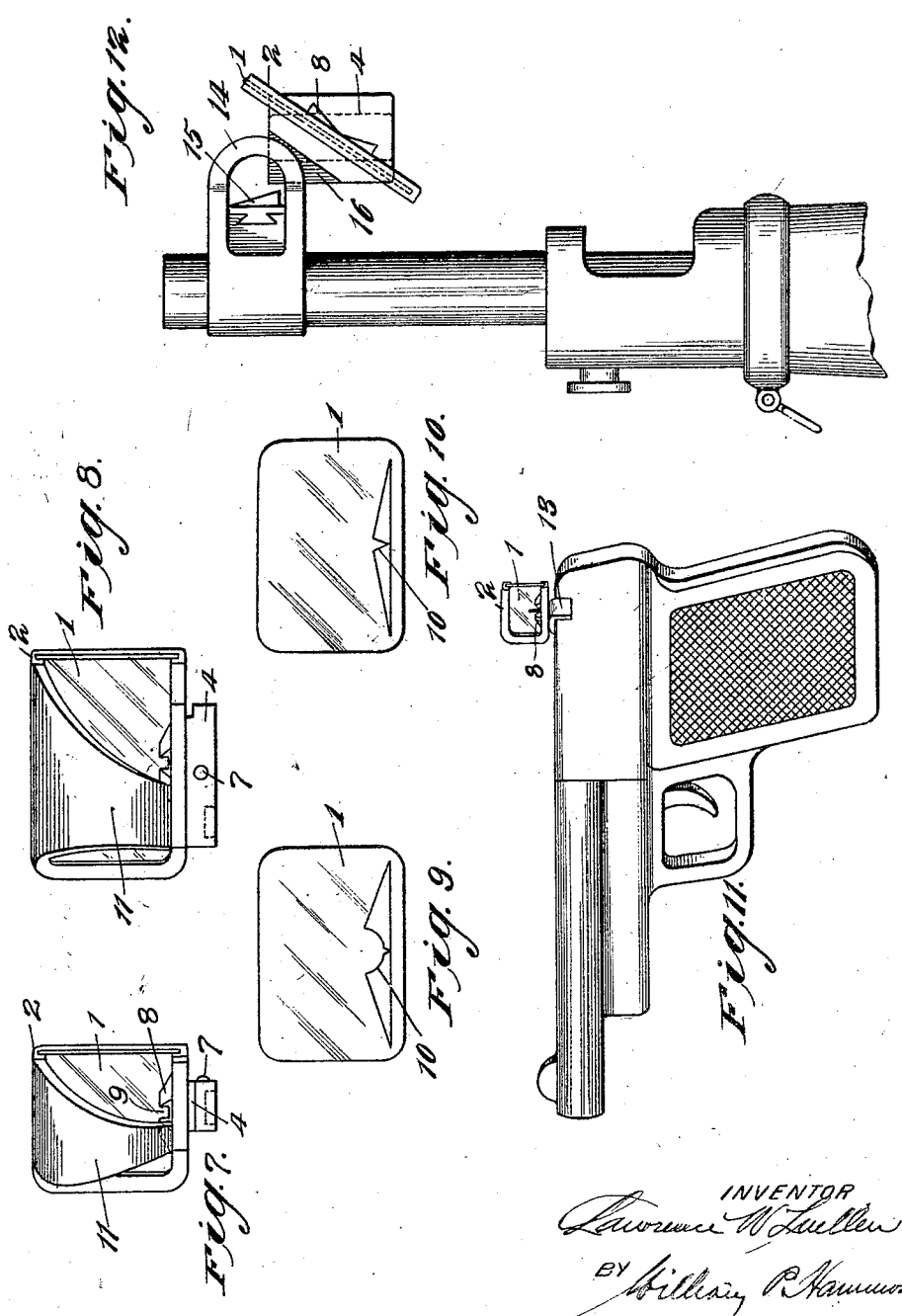

Patented Jan. 22, 1924.

1,481,294

UNITED STATES PATENT OFFICE.

LAWRENCE W. LUELLEN, OF MOUNTAIN LAKES, NEW JERSEY.

SIGHT FOR FIREARMS.

Application filed November 1, 1918. Serial No. 260,651.

*To all whom it may concern:*

Be it known that I, LAWRENCE W. LUELLEN, a citizen of the United States, residing in Mountain Lakes, county of Morris, and State of New Jersey, have invented certain new and useful Improvements in Sights for Firearms, of which the following is a specification.

The present invention relates particularly to means for sighting a firearm, rendering it possible to do so with the person or user of the arm concealed by a protecting barrier or obstruction.

My invention more particularly comprehends a reflecting rear sight for the conventional firearm, said reflecting sight being positioned at an angle of approximately 30° to the axis of the barrel, so that the user may, from the side of the arm, observe the object or objects in front and in the direction in which the arm is pointed, thus enabling him to accurately train the arm upon any particular spot or object upon which he may desire to fire. The reflecting sight preferably takes the form of a rectangular piece of highly polished metal, suitably mounted in a carrier or support detachably supported upon the firearm, the supporting connection between the sight and arm is preferably such as to render it readily removable so that the firearm can be used in the ordinary manner.

Another phase of my invention embodies the utilization of the reflecting sight as a periscope and when so used it is temporarily supported between the protecting ears of the front sight of the gun, with the reflecting surface angularly disposed to the barrel in such a way that upon raising the muzzle and mirror sight above the parapet the zone within its range will be reflected to the observer.

These and other objects of the invention will manifest themselves upon a reading of the following specification, the novel features thereof being pointed out in the appended claims.

In the accompanying drawings, I have illustrated certain preferable embodiments of the invention by way of example.

Figure 1 is a view in side elevation of an army rifle of the conventional type, equipped with a mirror sight, made in accordance with my invention.

Figure 2 is an enlarged detail in elevation of the mirror sight and a fragmentary portion of the range elevation mechanism of the gun on which it is supported.

Figure 3 is a view in vertical cross section taken on line III—III of Figure 2.

Figure 4 is a rear view of the sight in side elevation.

Figure 5 is a top plan view thereof.

Figure 6 is a transverse sectional view showing the manner in which the base of the mirror support is held in the sight elevating mechanism of the gun.

Figure 7 is a view similar to Figure 2 of a modified form of protecting support for the mirror sight.

Figure 8 is a side view thereof.

Figures 9 and 10 illustrate plan views respectively of reflectors bearing guide marking to facilitate the sighting of the arm.

Figure 11 illustrates one adaptation of the mirror sight to a revolver and

Figure 12 illustrates another adaptation of the mirror sight to a rifle when used as a periscope.

Referring to the drawings in detail, my improved sighting device preferably comprises a reflector 1, the same being made of metal with a nickeled surface brought to a high state of polish, so as to enable its use as a mirror. Obviously, an ordinary glass mirror will serve the same purpose, although owing to its fragile character, it is preferable to use metal instead of glass for this particular use. This reflector is mounted in a suitable support 2, which in the illustrated embodiment comprises a grooved die-casting having protecting overturned edges extending around three sides of the reflector, one side being open so that the reflector can be slid into position. Between the back of the mirror and casting is mounted a felt lining 3. The casting is provided with a base 4, rectangular in outline which fits snugly within the rectangular groove 5 of the elevating sight mechanism of the conventional army rifle illustrated at 6 (see Figure 1).

In order to assist in maintaining the device in position, a spring-pressed plunger 7 is arranged within the base of the device and cooperates with the frame of the elevating sight mechanism in the manner illustrated in Figure 6. The reflecting or mirror sight when in proper position is at an angle of approximately 30° to the longitudinal axis of the firearm and in order to facilitate the sighting of the arm, the mirror sight is provided with suitable guide or sight means so what when in line with the front sight and the objective, the arm will be properly trained. This guide means may take the form of a projection 8 having a central depression or indentation 9, and is preferably formed as a part of the casting or as shown in Figures 9 and 10, it may consist of suitable marking 10 applied directly upon the face of the reflecting surface itself when desired.

In order to destroy the reflection of strong rays of light which may be observed by an enemy, I provide the device with a suitable hood as indicated at 11 in Figures 7 and 8. This hood may be formed integral with the cast support or may consist of a separable part attached thereto. By shaping it in the manner illustrated, the device loses none of its advantages or utility as a sighting instrument but at the same time its reflecting power in any other direction than that which is in line with the observer's eyes is largely destroyed.

In Figure 11, the mirror sight is shown as applied to a conventional form of revolver. In this instance, a saddle in the form of a spring clip 13 is employed to hold it in position at the rear of the barrel.

In Figure 12, the reflecting sight is shown supported between the protecting ears 14 of the front sight 15 of the rifle, the base 16 of the sight being slightly cut away so as to be inserted between the ears and frictionally supported thereby in its proper position. Obviously when so supported the gun can be raised above the head of the user and in this manner employed as a periscope.

The strategic value of my invention will be at once appreciated by those familiar with military matters. By its use, a soldier is enabled to barricade himself behind an artificial as well as a natural barrier without exposing himself other than his hand which operates the trigger and observe through the reflector all that is immediately in front of him so that he may take accurate aim at an enemy without exposing himself and under other circumstances, as in trench warfare, where it is desired to see the enemy without being observed himself, he can utilize the mirror sight as a periscope in the manner illustrated and described.

While I have illustrated and described certain preferable embodiments of the principles of my invention, I do not wish to be limited to the manner in which those principles are utilized. I desire therefore to secure unto myself, the broad as well as the specific features of the invention in whatever form they may find embodiment.

Having thus described my invention what I claim as new herein and desire to secure by Letters Patent is:

1. In combination with a firearm, a reflecting sight detachably arranged adjacent the rear sight, said reflecting sight being provided with means for alignment with the front sight to facilitate the proper sighting of the arm, said means comprising a projection located immediately in advance and at the base of the reflector, said projection having a central depression.

2. In combination with a firearm, a reflecting sight detachably arranged adjacent the rear sight, said reflecting sight being provided with means for alignment with the front sight for facilitating the proper sighting of the arm.

3. The combination with a conventional firearm, of a reflecting sight element adapted to detachably engage the protecting ears of the front sight of the firearm to make it usable as a periscope, and also adapted to detachably engage the elevating sight of the firearm and be supported thereon in proper operative relation on the arm to serve as a rear sight therefor.

4. As a new article of manufacture, a reflecting sight for firearms provided with an obstructing hood to prevent the reflection of useless light rays, said obstructing hood consisting of a plate curving downwardly and outwardly from the upper end of and in front of the reflecting sight.

5. As a new article of manufacture, a reflecting sight for firearms provided with an obstructing hood to prevent the reflection of useless light rays, said obstructing hood consisting of a plate extending downwardly and outwardly from the upper end of and in front of the reflecting sight, the plate gradually decreasing in width from its top part to its lower end.

6. In combination with a firearm, a reflecting sight provided with a portion adapted to fit between and be frictionally supported by the protecting ears of the front sight of the firearm to make it usable as a periscope.

7. The combination with a conventional firearm of a reflecting rear sight including a die casting support therefor provided with a supporting base adapted to fit within the groove of the elevating sight of the firearm and be held therein in proper operative relation on the arm.

8. The combination with a conventional firearm, of a reflecting rear sight having a die casting support provided with a supporting base adapted to fit upon the elevating sight of the firearm, and means for holding the supporting base in position on the elevating sight in proper relation to the arm.

LAWRENCE W. LUELLEN.